United States Patent
Sugiura

(10) Patent No.: US 11,377,898 B2
(45) Date of Patent: Jul. 5, 2022

(54) VEHICLE DOOR OPENING/CLOSING APPARATUS AND ELECTROSTATIC SENSOR

(71) Applicant: AISIN CORPORATION, Aichi (JP)

(72) Inventor: Takehiko Sugiura, Kariya (JP)

(73) Assignee: AISIN CORPORATION, Kariya (JP)

( * ) Notice: Subject to any disclaimer, the term of this patent is extended or adjusted under 35 U.S.C. 154(b) by 132 days.

(21) Appl. No.: 16/019,938

(22) Filed: Jun. 27, 2018

(65) Prior Publication Data
US 2019/0010749 A1  Jan. 10, 2019

(30) Foreign Application Priority Data
Jul. 6, 2017  (JP) .............................. JP2017-132759

(51) Int. Cl.
 *E05F 15/73* (2015.01)
 *B60J 5/06* (2006.01)
 *E05F 15/46* (2015.01)

(52) U.S. Cl.
 CPC .............. *E05F 15/73* (2015.01); *B60J 5/06* (2013.01); *E05F 15/46* (2015.01); *E05Y 2400/508* (2013.01); *E05Y 2400/858* (2013.01); *E05Y 2800/428* (2013.01); *E05Y 2900/531* (2013.01)

(58) Field of Classification Search
 CPC .... E05F 15/73; E05F 15/46; E05Y 2900/531; E05Y 2800/428; E05Y 2400/858; E05Y 2400/508; B60J 5/06; B60R 25/2054
 USPC ......................................................... 701/49
 See application file for complete search history.

(56) References Cited

U.S. PATENT DOCUMENTS

| | | | | |
|---|---|---|---|---|
| 8,098,037 B2* | 1/2012 | Sugiura | ................... | E05F 15/70 318/451 |
| 8,688,325 B2* | 4/2014 | Wolf | .................. | G07C 9/00658 348/154 |
| 9,205,727 B2* | 12/2015 | Herthan | .............. | B60R 25/2045 |
| 9,587,417 B2* | 3/2017 | Van Gastel | ............. | E05B 81/78 |
| 9,707,929 B2* | 7/2017 | Holzberg | ............ | B60R 25/2054 |

(Continued)

FOREIGN PATENT DOCUMENTS

| | | |
|---|---|---|
| JP | 2007-308929 | 11/2007 |
| JP | 2014-500414 A | 1/2014 |
| JP | 2016-141312 | 8/2016 |

OTHER PUBLICATIONS

Japanese Office Action dated Nov. 24, 2021 in Japanese Patent Application No. 2017-132759, 4 pages.

*Primary Examiner* — Fadey S. Jabr
*Assistant Examiner* — Mohamed Abdo Algehaim
(74) *Attorney, Agent, or Firm* — Oblon, McClelland, Maier & Neustadt, L.L.P.

(57) ABSTRACT

A vehicle door opening/closing apparatus includes: an electrode provided near a vehicle door, which is opened and closed by driving of an actuator; a detection unit configured to separately detect presence or absence of an opening/closing operation of requesting opening/closing of the vehicle door by a user and presence or absence of a proximity state where a person exists in proximity of the vehicle door based on variation in an electrostatic capacity in the electrode; and a controller configured to drive the actuator when the opening/closing operation is detected by the detection unit even when an opening/closing request of the vehicle door from a device other than the detection unit is recognized and not to drive the actuator when the detection unit detects the proximity state.

15 Claims, 4 Drawing Sheets

(56) References Cited

U.S. PATENT DOCUMENTS

| | | | |
|---|---|---|---|
| 9,920,564 B2* | 3/2018 | Ebert | E05F 15/73 |
| 10,065,600 B2* | 9/2018 | Motoki | E05F 15/655 |
| 10,112,556 B2* | 10/2018 | Buttolo | B60R 16/005 |
| 10,317,251 B2* | 6/2019 | Sterk | H03K 17/955 |
| 10,669,767 B2* | 6/2020 | Nihei | G06V 40/20 |
| 2004/0262945 A1* | 12/2004 | Suzuki | E05B 65/0811 |
| | | | 296/155 |
| 2007/0205863 A1* | 9/2007 | Eberhard | B60R 25/2036 |
| | | | 340/5.72 |
| 2007/0266635 A1 | 11/2007 | Sugiura et al. | |
| 2008/0068145 A1* | 3/2008 | Weghaus | B60R 25/2054 |
| | | | 340/426.25 |
| 2009/0100755 A1* | 4/2009 | Ishihara | E05F 15/46 |
| | | | 49/31 |
| 2009/0120001 A1* | 5/2009 | Sugiura | E05F 15/70 |
| | | | 49/324 |
| 2011/0118946 A1* | 5/2011 | Reimann | B60R 25/2036 |
| | | | 701/49 |
| 2011/0276234 A1* | 11/2011 | Van Gastel | E05B 81/78 |
| | | | 701/49 |
| 2013/0060431 A1* | 3/2013 | Werner | E05B 85/01 |
| | | | 701/49 |
| 2013/0151084 A1* | 6/2013 | Lee | B60R 25/2054 |
| | | | 701/48 |
| 2013/0234733 A1* | 9/2013 | Lange | B60R 25/2045 |
| | | | 324/658 |
| 2014/0070920 A1* | 3/2014 | Elie | H03K 17/945 |
| | | | 340/5.72 |
| 2014/0195073 A1* | 7/2014 | Herthan | B60R 25/2045 |
| | | | 701/2 |
| 2015/0020450 A1* | 1/2015 | Shibayama | E05B 83/40 |
| | | | 49/31 |
| 2015/0025751 A1* | 1/2015 | Sugiura | B60J 5/06 |
| | | | 701/49 |
| 2015/0262436 A1* | 9/2015 | Herthan | B60R 25/2054 |
| | | | 340/5.72 |
| 2015/0267455 A1* | 9/2015 | Washeleski | E05F 15/46 |
| | | | 701/49 |
| 2016/0098877 A1* | 4/2016 | Tokudome | G07C 9/00944 |
| | | | 340/5.72 |
| 2016/0169708 A1* | 6/2016 | Sterk | H03K 17/955 |
| | | | 324/658 |
| 2016/0208538 A1* | 7/2016 | Nishikibe | E05F 15/632 |
| 2016/0265263 A1* | 9/2016 | Motoki | B60R 25/2054 |
| 2017/0130509 A1* | 5/2017 | Sugiura | H03K 17/955 |
| 2017/0152697 A1* | 6/2017 | Dehelean | E05F 15/73 |
| 2017/0241186 A1* | 8/2017 | Koda | H03K 17/955 |
| 2017/0241187 A1* | 8/2017 | Takayanagi | E05F 15/75 |
| 2018/0030771 A1* | 2/2018 | Washeleski | E05F 15/40 |
| 2018/0135339 A1* | 5/2018 | Kubo | E05B 85/10 |
| 2019/0085611 A1* | 3/2019 | Shibata | E05F 15/60 |
| 2019/0267993 A1* | 8/2019 | Sawada | G01V 3/088 |

* cited by examiner

VEHICLE DOOR OPENING/CLOSING APPARATUS AND ELECTROSTATIC SENSOR

CROSS REFERENCE TO RELATED APPLICATIONS

This application is based on and claims priority under 35 U.S.C. § 119 to Japanese Patent Application 2017-132759, filed on Jul. 6, 2017, the entire contents of which are incorporated herein by reference.

TECHNICAL FIELD

This disclosure relates to a vehicle door opening/closing apparatus and an electrostatic sensor.

BACKGROUND DISCUSSION

Conventionally, a vehicle door opening/closing apparatus, which opens and closes a vehicle door through the driving control of an actuator, is well known.

A vehicle door opening/closing apparatus of JP 2007-308929A (Reference 1) controls the driving of an actuator such that the speed of opening/closing of a vehicle door is lowered when a noncontact-type object detection device detects that an object is present on the displacement path of the vehicle door. In addition, the vehicle door opening/closing apparatus controls the driving of the actuator such that the displacement of the vehicle door stops or the displacement of the vehicle door is reversed when a contact-type object detection device detects the contact between the vehicle door and the object.

A person who inputs an opening/closing operation of the vehicle door and a person who is located near the vehicle door may be different from each other. In such a case, there is a risk that confusion such as delay in noticing the opening/closing operation of the vehicle door may be given to the person who is located near the vehicle door.

Thus, a need exists for a vehicle door opening/closing apparatus and an electrostatic sensor, which are not susceptible to the drawback mentioned above.

SUMMARY

A vehicle door opening/closing apparatus according to an aspect of this disclosure includes: an electrode provided near a vehicle door, which is opened and closed by driving of an actuator; a detection unit configured to separately detect presence or absence of an opening/closing operation of requesting opening/closing of the vehicle door by a user and presence or absence of a proximity state where a person exists in proximity of the vehicle door based on variation in an electrostatic capacity in the electrode; and a controller configured to drive the actuator when the opening/closing operation is detected by the detection unit even when an opening/closing request of the vehicle door from other than the detection unit is recognized and not to drive the actuator when the detection unit detects the proximity state.

An electrostatic sensor according to another aspect of this disclosure includes an electrode provided near a vehicle door and a detection unit configured to separately detect presence or absence of an opening/closing operation of requesting opening/closing of the vehicle door by a user and presence or absence of a state where a person exists in proximity of the vehicle door based on variation in an electrostatic capacity in the electrode.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment in which a vehicle door opening/closing apparatus is embodied as a slide door opening/closing apparatus will be described with reference to the accompanying drawings.

Figure 1:
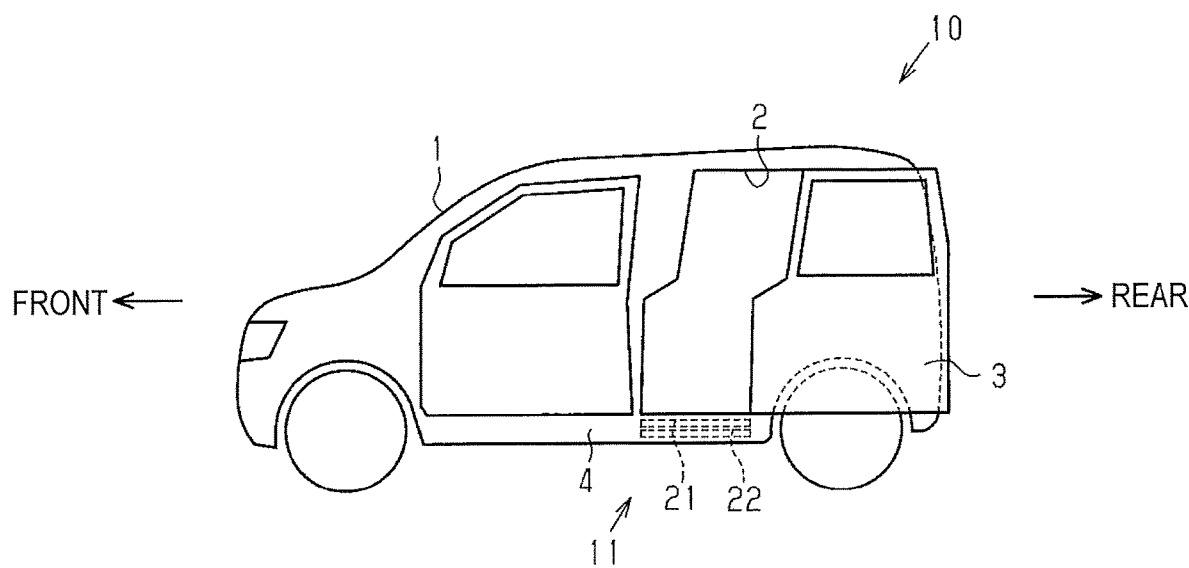
FIG. 1 is a side view illustrating a vehicle side portion.

As illustrated in FIG. 1, a vehicle 1 includes a slide door 3, which is capable of opening/closing an opening 2 provided in a vehicle side portion, and also includes a slide door opening/closing apparatus 10, which opens and closes the slide door 3.

Figure 2A:
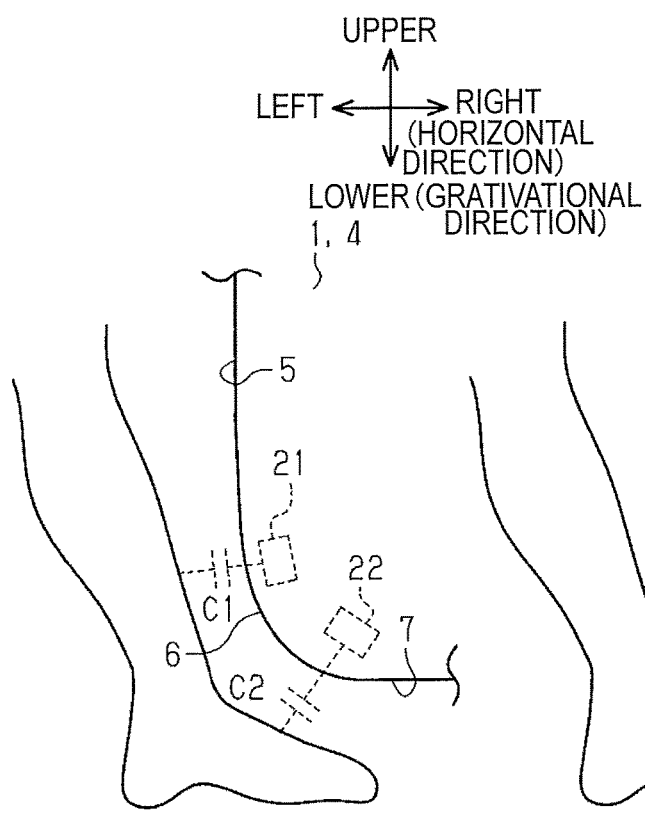
FIG. 2A is a side view illustrating a state where an operation of putting in/out a foot relative to a vehicle lower part is being performed.
Figure 2B:
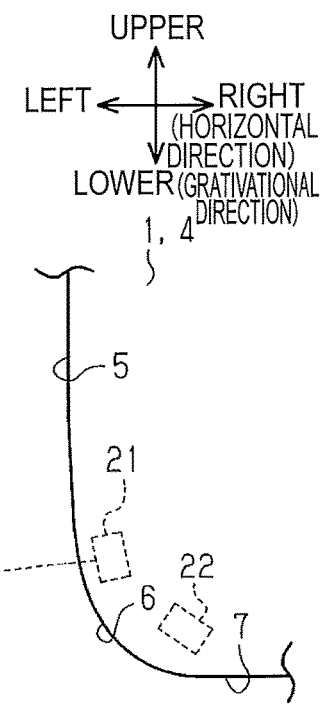
FIG. 2B is a side view illustrating a state where a conductor (person) is located at the vehicle side portion.

As illustrated in FIGS. 1 and 2, the vehicle 1 includes a mounting portion 4, on which an electrostatic sensor 11 is provided, below the opening 2. In addition, here, since the slide door 3 is provided on the vehicle left side, the mounting portion 4 on the vehicle left side will be described.

The mounting portion 4 includes a vertical surface 5 along the gravitational direction, a curved surface 6, which is smoothly curved so as to be continuously directed downward from a lower edge portion of the vertical surface 5 and gradually directed rightward, and a horizontal surface 7, which extends rightward from a right edge portion of the curved surface 6 so as to continuously extend the horizontal direction.

Figure 3:
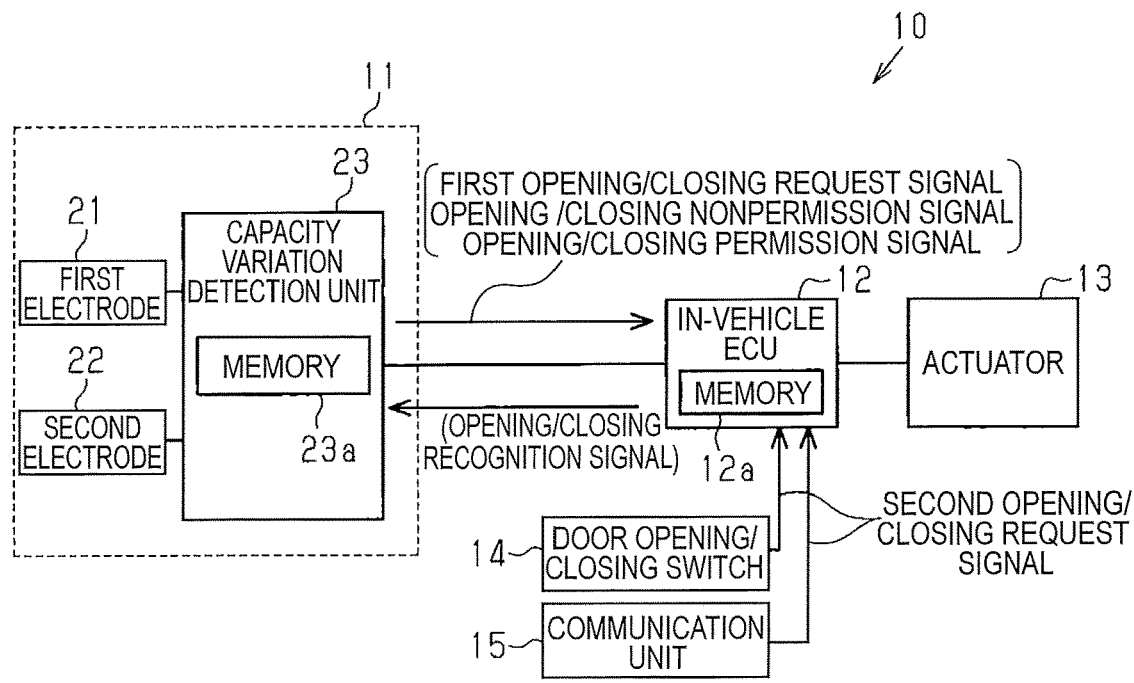
FIG. 3 is a block diagram illustrating an electrical configuration of a slide door opening/closing apparatus.

As illustrated in FIG. 3, the slide door opening/closing apparatus 10 includes an electrostatic sensor 11 provided on the mounting portion 4, an in-vehicle ECU 12, and an actuator 13.

As illustrated in each of FIGS. 1, 2A, 2B and 3, the electrostatic sensor 11 includes a first electrode 21, a second electrode 22, and a capacity variation detection unit 23.

The first electrode 21 is a plate-shaped or rod-shaped electrode that extends in the vehicle longitudinal direction, and is provided near the boundary between the vertical surface 5 and the curved surface 6. The first electrode 21 is provided so that a plate surface thereof is parallel to a tangent line at the boundary between the vertical surface 5 and the curved surface 6. In addition, the first electrode 21 corresponds to an upper electrode.

The second electrode 22 is a plate-shaped or rod-shaped electrode that extends in the vehicle longitudinal direction, and is provided near the boundary between the curved surface 6 and the horizontal surface 7. The second electrode 22 is provided so that a plate surface thereof is parallel to a tangent line at the boundary between the curved surface 6 and the horizontal surface 7. In addition, the second electrode 22 corresponds to a lower electrode.

The first electrode 21 and the second electrode 22 are electrically connected to the capacity variation detection unit 23, respectively.

An electrostatic capacity of the first electrode 21 varies according to the distance between the first electrode 21 and a conductor such as, for example, the person when the conductor comes close to the first electrode 21.

The electrostatic capacity of the second electrode 22 varies according to the distance between the second electrode 22 and a conductor such as, for example, the person when the conductor comes close to the second electrode 22.

The capacity variation detection unit 23 determines the presence or absence of an operation of putting in/out a foot relative to the lower part of the vehicle 1, more precisely, below the mounting portion 4, from temporal variation in an electrostatic capacity in each of the first electrode 21 and the second electrode. When it is determined that there is an operation of putting in/out the foot below the mounting portion 4, the capacity variation detection unit 23 generates a first opening/closing request signal.

In addition, the capacity variation detection unit 23 determines whether or not a conductor such as, for example, the person is located on the side portion of the vehicle 1, more precisely, whether or not the conductor is located on the movement path of the slide door 3 from the temporal variation in the electrostatic capacity in the first electrode 21. The capacity variation detection unit 23 generates an opening/closing nonpermission signal when determining that the conductor is located on the movement path of the slide door 3, and generates an opening/closing permission signal when determining that the conductor is not located on the movement path of the slide door 3.

The in-vehicle ECU 12 controls the driving of the actuator 13 based on the detection result of the electrostatic sensor 11. That is, the in-vehicle ECU 12 drives the actuator 13 when recognizing the first opening/closing request signal from the capacity variation detection unit 23. Thereby, the slide door 3 is displaced from the closed state to the opened state, or from the opened state to the closed state.

In addition, the in-vehicle ECU 12 is electrically connected to a door opening/closing switch 14 provided in a driver's seat and to a communication unit 15, which wirelessly communicates with an electronic key of the vehicle 1.

The in-vehicle ECU 12 drives the actuator 13 in a state where it recognizes the opening/closing permission signal from the electrostatic sensor 11 (the capacity variation detection unit 23) when recognizing a second opening/closing request signal that requests for the opening/closing of the slide door 3 by an operation of the opening/closing switch 14 or by an operation of a remote switch provided in the electronic key via the communication unit 15. Thereby, the slide door 3 is displaced from the closed state to the opened state, or from the opened state to the closed state.

On the other hand, the in-vehicle ECU 12 does not drive the actuator 13 until it recognizes the opening/closing permission signal in a state where it has received the opening/closing permission signal from the electrostatic sensor 11 (the capacity variation detection unit 23) when recognizing the second opening/closing request signal. In addition, the in-vehicle ECU 12 corresponds to a controller.

Next, a processing procedure in the capacity variation detection unit 23 will be described with reference to the flowchart illustrated in FIG. 5. The processing procedure illustrated in the flowchart is stored in advance in a memory 23a, which is provided in the capacity variation detection unit 23. In addition, the capacity variation detection unit 23 periodically executes a processing illustrated in the flowchart of FIG. 5.

Figure 5:
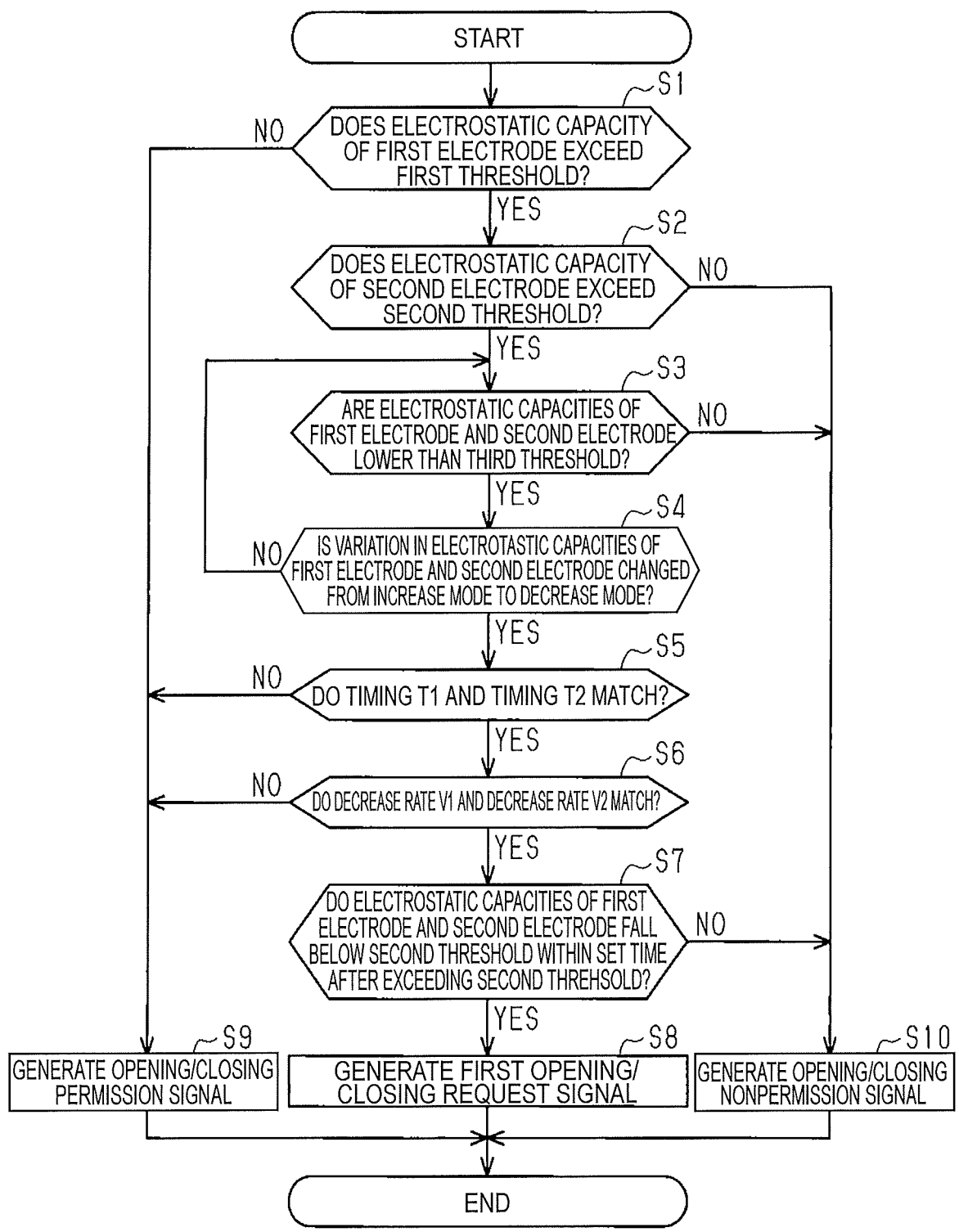
FIG. 5 is a flowchart illustrating a processing procedure in a capacity variation detection unit.

As illustrated in FIG. 5, first, the capacity variation detection unit 23 determines whether or not an amount of variation in the electrostatic capacity of the first electrode 21 exceeds a first threshold (step S1). That is, in step S1, it is determined whether or not the amount of variation in the electrostatic capacity of a capacitor C1 (see FIG. 2A) formed between the first electrode 21 and a conductor (the upper side of the ankle) exceeds the first threshold. In addition, the first threshold is a value that is set in consideration of a possibility of the conductor being located on the movement path of the slide door 3.

When the result in step S1 is YES, that is, when the amount of variation in the electrostatic capacity of the first electrode 21 exceeds the preset first threshold, the capacity variation detection unit 23 determines whether or not the amount of variation in the electrostatic capacity of the second electrode 22 exceeds a second threshold (step S2). That is, in step S2, it is determined whether or not the amount of variation in the electrostatic capacity of a capacitor C2 (see FIG. 2A) formed between the second electrode 22 and a conductor (tiptoe) exceeds the second threshold. In addition, the second threshold is a value that is set in consideration of the putting-in/out of the foot below the mounting portion 4.

When the result in step S2 is YES, that is, when the amount of variation in the electrostatic capacity of the second electrode 22 exceeds the preset second threshold, the capacity variation detection unit 23 determines whether or not the amount of variation in the electrostatic capacity in each of the first electrode 21 and the second electrode 22 is lower than a third threshold, which is set in advance to an upper limit value (step S3). In addition, the third threshold is value that is set in consideration of whether the conductor is assumed to be the person or a metal having a large amount of variation in electrostatic capacity than that of the person.

When the result in step S3 is YES, that is, when the amount of variation in the electrostatic capacity in each of the first electrode 21 and the second electrode 22 is lower than the third threshold, it is determined whether or not variation in the electrostatic capacity in each of the first electrode 21 and the second electrode 22 is being changed from an increase mode to a decrease mode (step S4).

Figure 4:
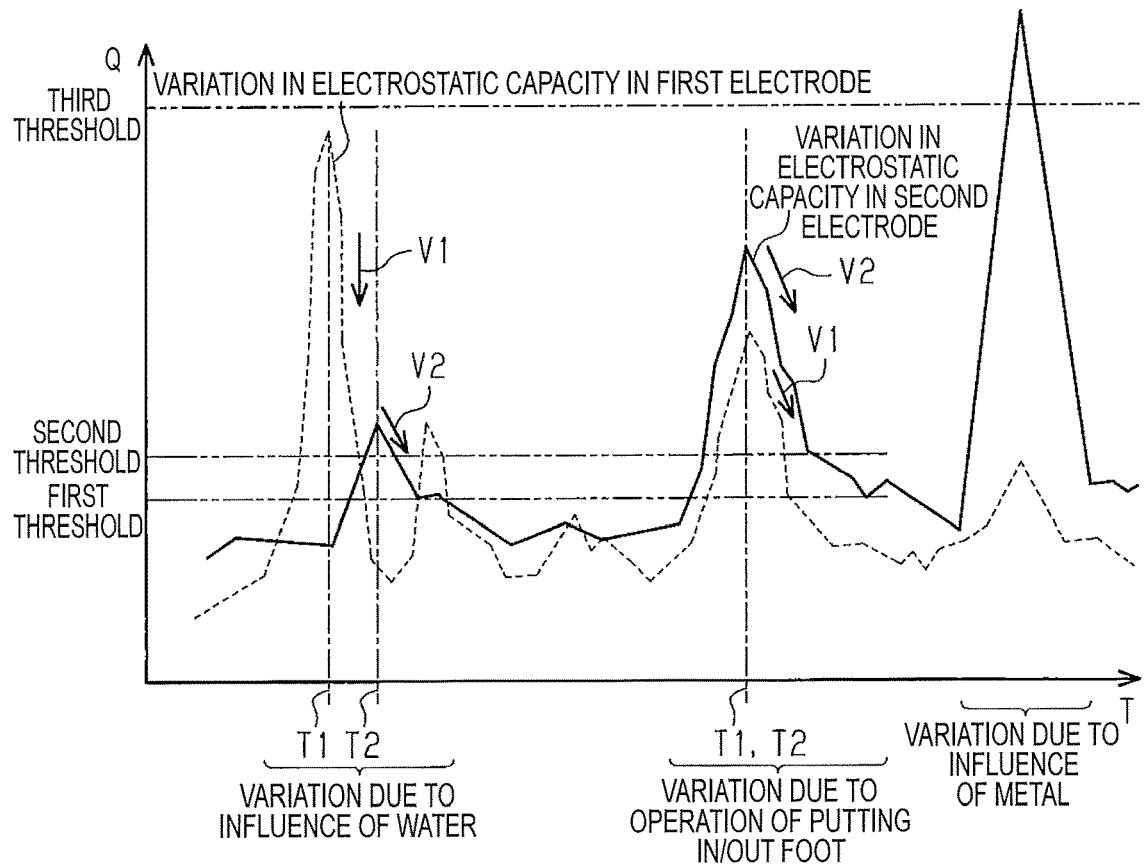
FIG. 4 is a timing chart illustrating an example of variation in an electrostatic capacity in each electrode due to an operation of putting in/out a foot, when influenced by water, and when influenced by a metal.

When the result in step S4 is YES, that is, when variation in the electrostatic capacity in each of the first electrode 21 and the second electrode 22 is being changed from the increase mode to the decrease mode, the capacity variation detection unit 23 determines whether or not the timing T1 at which the amount of variation in the electrostatic capacity of the first electrode 21 reaches a peak and the timing T2 at which the amount of variation in the electrostatic capacity of the second electrode 22 reaches a peak match (step S5, see FIG. 4).

When the result in step S5 is YES, that is, when the timing T1 at which the amount of variation in the electrostatic capacity of the first electrode 21 reaches a peak and the timing T2 at which the amount of variation in the electrostatic capacity of the second electrode 22 reaches a peak match, the capacity variation detection unit 23 determines whether or not a decrease rate V1 of the amount of variation in the electrostatic capacity of the first electrode 21 and a decrease rate V2 of the amount of variation in the electrostatic capacity of the second electrode 22 match (step S6).

When the result in step S6 is YES, that is, when the decrease rate V1 of the amount of variation in the electrostatic capacity of the first electrode 21 matches the decrease rate V2 of the amount of variation in the electrostatic capacity of the second electrode 22, the capacity variation detection unit 23 determines whether or not the amount of variation in the electrostatic capacity in each of the first electrode 21 and the second electrode 22 falls below the second threshold within a set time after it exceeds the second threshold (step S7).

When the result in step S7 is YES, that is, when the amount of variation in the electrostatic capacity in each of the first electrode 21 and the second electrode 22 falls below the second threshold within the set time after it exceeds the second threshold, the capacity variation detection unit 23 generates a first opening/closing request signal that indicates that the operation of putting in/out the foot is performed below the vehicle 1 (the mounting portion 4) (step S8), and ends a series of processings.

In addition, when the result in step S1 is NO, that is, when the amount of variation in the electrostatic capacity of the first electrode 21 does not exceed the preset first threshold, the capacity variation detection unit 23 generates an opening/closing permission signal (step S9), and ends a series of processings. A situation where the result in step S1 is NO is a situation where it is estimated that a conductor such as, for example, the person is not located on the side portion of the vehicle 1, more accurately, the conductor is not located on the movement path of the slide door 3.

In addition, when the result in step S2 is NO, that is, when the amount of variation in the electrostatic capacity of the second electrode 22 does not exceed the preset second threshold, the capacity variation detection unit 23 generates an opening/closing nonpermission signal (step S10), and ends a series of processing. The situation in which the result in step S2 is NO is a situation in which it is estimated that the conductor such as, for example, the person is located on the side portion of the vehicle 1, more precisely, the conductor is located on the movement path of the slide door 3.

In addition, when the result in step S3 is NO, that is, when the amount of variation in the electrostatic capacity in each of the first electrode 21 and the second electrode 22 is not lower than the third threshold, the capacity variation detection unit 23 shifts the processing to step S10. A situation in which the result in step S3 is NO is a situation in which it is estimated that a conductor such as, for example, a metal is located on the side portion of the vehicle 1, more precisely, the conductor is located on the movement path of the slide door 3.

In addition, when the result in step S4 is NO, that is, when variation in the electrostatic capacity in each of the first electrode 21 and the second electrode 22 is not changed from the increase mode to the decrease mode, the capacity variation detection unit 23 shifts the processing to step S3.

In addition, when the result in step S5 is NO, that is, when the timing T1 at which the amount of variation in the electrostatic capacity of the first electrode 21 reaches a peak and the timing T2 at which the amount of variation in the electrostatic capacity of the second electrode 22 reaches a peak do not match, the capacity variation detection unit 23 shifts the processing to step S9.

In addition, when the result in step S6 is NO, that is, when the decrease rate V1 of the amount of variation in the electrostatic capacity of the first electrode 21 and the decrease rate V2 of the amount of variation in the electrostatic capacity of the second electrode 22 do not match, the capacity variation detection unit 23 shifts the processing to step S9. A situation in which the results in step S5 and step S6 are NO is a situation in which it is estimated that the electrostatic capacity has varied due to the influence of water, that is, a situation in which it is estimated that a conductor such as, for example, the person is not located on the side portion of the vehicle 1, more precisely, that the conductor is not located on the movement path of the slide door 3.

In addition, when the result in step S7 is NO, that is, when the amount of variation in the electrostatic capacity in each of the first electrode 21 and the second electrode 22 does not fall below the second threshold within the set time after it exceeds the second threshold, the capacity variation detection unit 23 shifts the processing to step S10. A situation in which the result in step S7 is NO is a situation in which it is estimated that, although the user attempted to perform the operation of putting in/out the foot, the foot is caught by a component of the vehicle 1, or any other object or person is located near the slide door 3 during the putting-in/out of the foot.

Next, a processing procedure in the in-vehicle ECU 12 will be described with reference to the flowchart illustrated in FIG. 6. The processing procedure illustrated in the flowchart is stored in advance in a memory 12a provided in the in-vehicle ECU 12. In addition, the in-vehicle ECU 12 periodically executes a processing illustrated in the flowchart of FIG. 6.

Figure 6:
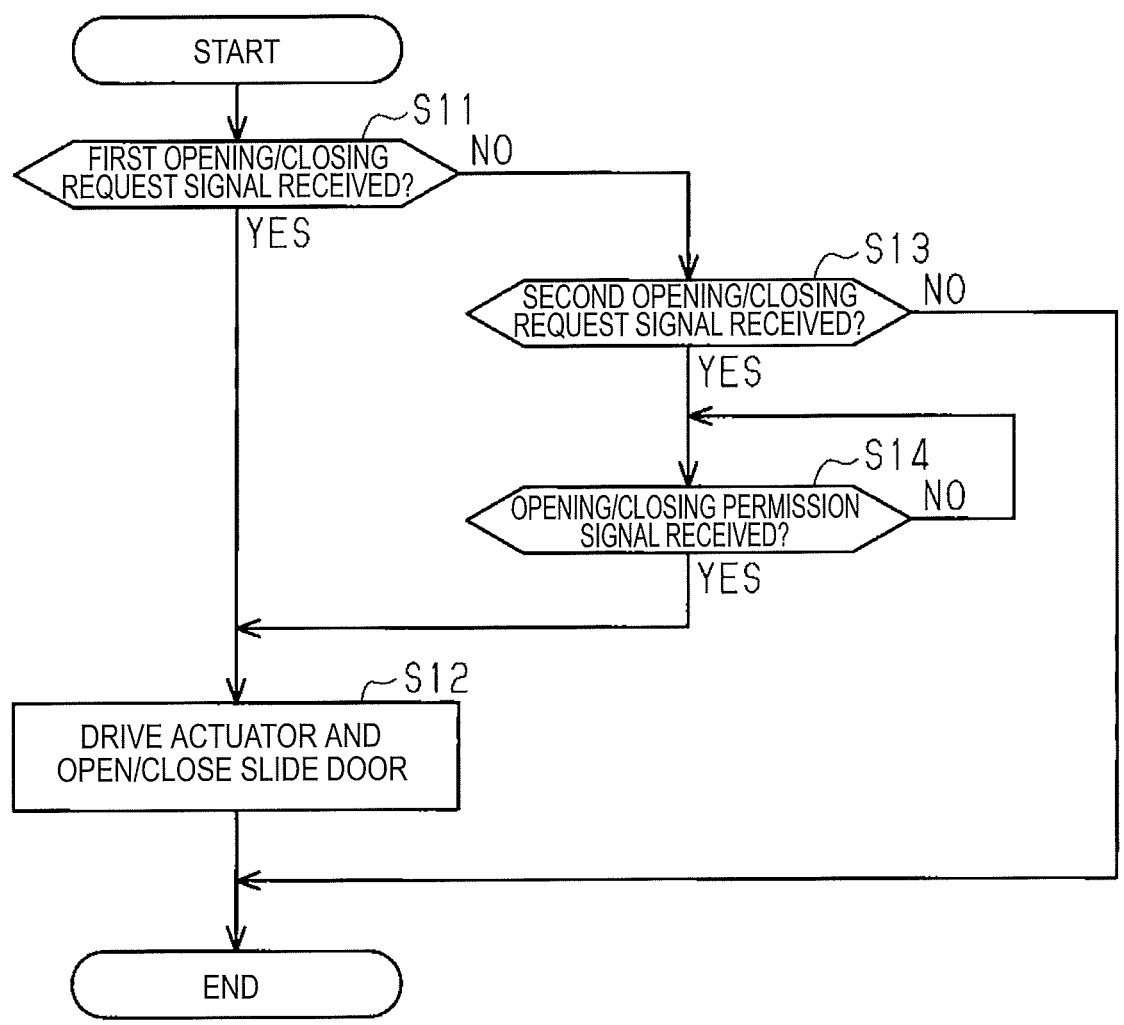
FIG. 6 is a flowchart illustrating a processing procedure in an in-vehicle ECU.

As illustrated in FIG. 6, the in-vehicle ECU 12 first determines whether or not it has received a first opening/closing request signal (step S11).

When the result in step S11 is YES, that is, when the in-vehicle ECU 12 has received the first opening/closing request signal, the in-vehicle ECU 12 opens and closes the slide door 3 by driving the actuator 13 (step S12), and ends a series of processings. A situation in which the result in step S11 is YES is a situation in which it is estimated that the user of the vehicle 1 has performed the operation of putting in/out the foot below the mounting portion 4.

When the result in step S11 is NO, that is, when the in-vehicle ECU 12 has not received the first opening/closing request signal, the in-vehicle ECU 12 determines whether or not it has received a second opening/closing request signal (step S13).

When the result in step S13 is YES, that is, when the in-vehicle ECU 12 has received the second opening/closing request signal, the in-vehicle ECU 12 determines whether or not it has received an opening/closing permission signal (step S14).

When the result in step S14 is YES, that is, when the in-vehicle ECU 12 has received the opening/closing permission signal, the in-vehicle ECU 12 shifts the processing to step S12. A situation in which the result in step S14 is YES is a situation in which it is estimated that the opening/closing switch 14 or the electronic key is operated and a conductor such as, for example, the person is not located on the side portion of the vehicle 1, more precisely, that the conductor is not located on the movement path of the slide door 3.

When the result in step S14 is NO, that is, when the in-vehicle ECU 12 has not received the opening/closing permission signal, in other words, when the in-vehicle ECU 12 has received the opening/closing nonpermission signal, the in-vehicle ECU 12 repeats the processing of step S14. A situation in the result in step S14 is NO is a situation in which it is estimated that the opening/closing switch 14 or the electronic key is operated and that a conductor such as, for example, the person is located on the side portion of the vehicle 1, more precisely, that the conductor is located on the movement path of the slide door 3.

In addition, when the result in step S13 is NO, that is, when the in-vehicle ECU 12 has not received the second opening/closing request signal, the in-vehicle ECU 12 ends a series of processings without driving the actuator 13, in other words, without opening/closing the slide door 3.

Next, an action and effects of the slide door opening/closing apparatus 10 will be described.

(1) The capacity variation detection unit 23 may detect the presence or absence of the operation of putting in/out the foot below the mounting portion 4 from the amount of variation in the electrostatic capacity in each of the first electrode 21 and the second electrode 22. In addition, the capacity variation detection unit 23 may detect whether or not a conductor such as, for example, the person is located on the side portion of the vehicle 1, more precisely, whether or not there is a possibility that the conductor is located on the movement path of the slide door 3 from the amount of variation in the electrostatic capacity in each of the first electrode 21 and the second electrode 22.

Thereby, even if the opening/closing switch 14 or the electronic key is operated, the in-vehicle ECU 12 may perform control so as not to drive the actuator 13 in a case where there is a possibility that the conductor may be located on the movement path of the slide door 3.

That is, even if the opening/closing switch 14 or the electronic key is operated in a situation in which there is a possibility that a person who operates the opening/closing switch 14 or the electronic key and a person who is located near the slide door 3 are different, the slide door 3 is not opened and closed. Therefore, the slide door opening/closing apparatus 10 is difficult to throw a person who is located near the slide door 3 into confusion, such as a delay in noticing the opening/closing operation of the slide door 3.

In addition, the electrostatic sensor 11, which detects the operation of putting in/out the foot below the vehicle 1, is a well-known detection device. That is, since the slide door opening/closing apparatus 10 merely changes the control of detection of a known detection device, there is no need to separately provide a detection device in the vehicle, and the slide door opening/closing apparatus 10 are easily applied to existing vehicles.

(2) When the in-vehicle ECU 12 has received an opening/closing nonpermission signal from electrostatic sensor 11 in a state where it has recognized a second opening/closing request signal via an operation of the opening/closing switch 14 or the electronic key, the in-vehicle ECU 12 repeats a processing of confirming the reception of the opening/closing permission signal until it receives the opening/closing permission signal from the electrostatic sensor 11 (step S14 in FIG. 6).

Thereby, when a situation in which there is a possibility that a conductor such as, for example, the person is located on the side portion of the vehicle 1, more precisely, that the conductor is located on the movement path of the slide door 3 is changed to a situation in which there is no possibility that the conductor is located on the movement path of the slide door 3 via movement of the conductor, the vehicle door is opened and closed. That is, according to the slide door opening/closing apparatus 10, once the opening/closing switch 14 or the electronic key is operated, the slide door 3 is opened and closed in a safer state. In addition, since there is no need to operate again, usability is also good.

(3) The electrostatic sensor 11 is configured by the first electrode 21, the second electrode 22, and the capacity variation detection unit 23, which are provided on the mounting portion 4, which is the lower portion of the vehicle below the slide door 3. Thereby, the capacity variation detection unit 23 may detect the presence or absence of the operation of putting in/out the foot relative to the mounting portion 4 and may also detect whether or not a conductor such as, for example, the person is located on the side portion of the vehicle 1, more precisely, whether or not there is a possibility that the conductor is located on the movement path of the slide door 3 from the amount of variation in the electrostatic capacities of the first electrode 21 and the second electrode 22.

(4) The capacity variation detection unit 23 may separately detect whether variation in the electrostatic capacity is caused due to the operation of putting in/out the foot or due to a liquid such as, for example, water from the amount of variation in the electrostatic capacity of the first electrode 21 and the second electrode 22.

(5) The capacity variation detection unit 23 may separately detect whether or not variation in the electrostatic capacity is caused due to the operation of putting in/out the foot or due to the passage of, for example, a small animal below the vehicle from the amount of variation in the electrostatic capacities of the first electrode 21 and the second electrode 22.

In addition, the above embodiment may be modified as follows.

In the above embodiment, the amount of variation in the electrostatic capacities in the first electrode 21 and the second electrode 22, caused by a body of the slide door 3 at the position (the opening/closing position) of the slide door 3, may be stored in advance in the memory 23a. The capacity variation detection unit 23 may separately determine whether variation in the electrostatic capacities in the first electrode 21 and the second electrode 22 is caused due to the opening/closing of the slide door 3 or due to the proximity of a conductor such as, for example, the person, by considering the amount of variation in the electrostatic capacity stored in advance in the memory 23a.

Normally, the electrostatic capacity detected by the electrostatic sensor 11 gradually increases as the slide door 3 shifts from the fully opened state to the fully closed state. Conversely, the electrostatic capacity detected by the electrostatic sensor 11 gradually decreases as the slide door 3 shifts from the fully closed state to the fully opened state. By taking into consideration of the amount of variation in the electrostatic capacity stored in advance in the memory 23a as in the present example, it is possible to prevent the capacity variation detection unit 23 from erroneously determining variation in the electrostatic capacities in the first electrode 21 and the second electrode 22 due to the opening/closing of the slide door 3 as the proximity of a conductor such as, for example, the person. In other words, through the use of the electrostatic sensor 11, the detection accuracy of the operation of putting in/out the foot is improved.

In the above embodiment, the capacity variation detection unit 23 generates the opening/closing nonpermission signal when detecting the conductor's proximity to the vehicle door based on variation in the electrostatic capacity of the first electrode 21 (upper electrode). Thereby, since the in-vehicle ECU 12 does not drive the actuator 13 even when recognizing the second opening/closing request signal, it is difficult to cause confusion, for example, a delay in noticing the opening/closing operation of the slide door 3.

On the other hand, the capacity variation detection unit 23 may be configured so as to generate the opening/closing nonpermission signal even when detecting the conductor's proximity to the vehicle door based on variation in the electrostatic capacity of the second electrode 22 (lower electrode). With such a configuration, for example, in a case where a small animal such as, for example, a dog or a cat, or an object (conductor) exists below the slide door 3, it is possible to prevent the small animal from coming into contact with the slide door 3 due to a delay in noticing the opening/closing operation of the slide door 3 or to prevent the object located on the movement path of the slide door 3 from coming into contact with the slide door 3.

In the above embodiment, the first threshold and the second threshold may be a common value.

In the above embodiment, the capacity variation detection unit 23 determines the presence or absence of the operation of putting in/out the foot and whether or not there is a conductor on the side portion of the vehicle 1 based on the first threshold, but may use different thresholds for these determinations.

In the above embodiment, in the processing procedure illustrated in FIG. 5, the capacity variation detection unit 23 may omit the processing of step S6, that is, the processing of determining whether or not the decrease rate V1 of the amount of variation in the electrostatic capacity of the first electrode 21 and the decrease rate V2 of the amount of variation in the electrostatic capacity of the second electrode 22 match. Even in such a configuration, the effect of (1) of the above embodiment may be obtained.

In addition, in the above embodiment, in the processing procedure illustrated in FIG. 5, the capacity variation detection unit 23 may omit the processing of step S5, that is, the processing of determining whether or not the timing T1 at which the amount of variation in the electrostatic capacity of the first electrode 21 reaches a peak and the timing T2 at which the amount of variation in the electrostatic capacity of the second electrode 22 reaches a peak match. Even in such a configuration, the effect of (1) of the above embodiment may be obtained.

In the above embodiment, in the processing procedure illustrated in FIG. 5, the capacity variation detection unit 23 may omit the processing of step S3, that is, the processing of determining whether or not the electrostatic capacities of the first electrode 21 and the second electrode is lower than the third threshold. In addition, in this case, the processing of step S4 is also eliminated. Even in such a configuration, the effect of (1) of the above embodiment may be obtained.

In the above embodiment, in the processing procedure illustrated in FIG. 6, the in-vehicle ECU 12 may end the processing without repeating the processing of step S14 when the result in step S14 is NO, in other words, when not receiving the opening/closing permission signal. In this case, it is necessary to operate the opening/closing switch 14 or the electronic key again, but the effect of (1) of the above embodiment may be obtained.

In the above embodiment, matching of the timings T1 and T2 is not limited to exact matching. A state where the timing T2 is included within a preset setting range on the basis of the timing T1 may also be processed as matching of the timings T1 and T2.

In the above embodiment, matching of the decrease rates V1 and V2 is not limited to exact matching. A state where the decrease rate V2 is included within a preset setting range on the basis of the decrease rate V1 may also be processed as matching of the decrease rates V1 and V2.

In the above embodiment, the first electrode 21 and the second electrode 22, which constitute the electrostatic sensor 11, are provided on the mounting portion 4 below the slide door 3, but the mounting portion 4 may be a portion of the body of the vehicle 1, or may be a part that is retrofitted to the body of the vehicle 1 such as, for example, a step.

In the above embodiment, the vehicle door is the slide door 3, but may also be applied to other vehicle doors such as a back door.

A vehicle door opening/closing apparatus according to an aspect of this disclosure includes: an electrode provided near a vehicle door, which is opened and closed by driving of an actuator; a detection unit configured to separately detect presence or absence of an opening/closing operation of requesting opening/closing of the vehicle door by a user and presence or absence of a proximity state where a person exists in proximity of the vehicle door based on variation in an electrostatic capacity in the electrode; and a controller configured to drive the actuator when the opening/closing operation is detected by the detection unit even when an opening/closing request of the vehicle door from other than the detection unit is recognized and not to drive the actuator when the detection unit detects the proximity state.

According to this configuration, the controller does not drive the actuator when the opening/closing of the vehicle door is input in a state where the proximity state where the person exists in the proximity of the vehicle door is detected, and does not open and close the vehicle door. Thereby, it is difficult to throw a person who is located near the vehicle door into confusion such as, for example, a delay in noticing the opening/closing operation of the vehicle door.

In addition, the detection unit is a well-known component that is capable of detecting the presence or absence of the opening/closing operation of requesting the opening/closing of the vehicle door by the user. That is, since the vehicle door opening/closing apparatus merely changes the control of detection of a well-known detection device, there is no need to separately provide a detection device in a vehicle. Therefore, the vehicle door opening/closing apparatus may be easily applied to existing vehicles.

In the configuration described above, when the controller recognizes the opening/closing request of the vehicle door from a device other than the detection unit in a state where the detection unit detects the person's proximity to the vehicle door, the controller drives the actuator in response to the opening/closing request with cancelling of the state where the proximity to the vehicle door is detected by the detection unit, as a trigger.

According to this configuration, once the opening/closing is requested, the vehicle door is opened and closed in a safer situation. In addition, since there is no need to operate again, usability is also good.

In the above configuration, the electrode may include an upper electrode provided on a vehicle lower portion below the vehicle door and a lower electrode provided below the upper electrode in a gravitational direction, and the detection unit detects an instruction of opening/closing the vehicle door based on variation in the electrostatic capacities in both the upper electrode and the lower electrode, and detects the proximity to the vehicle door based on variation in the electrostatic capacity of the upper electrode.

According to this configuration, it is easy to detect the presence or absence of an operation of putting in/out the foot relative to the vehicle lower portion and whether or not a conductor is located near the vehicle door.

An electrostatic sensor according to another aspect of this disclosure includes an electrode provided near a vehicle door and a detection unit configured to separately detect presence or absence of an opening/closing operation of requesting opening/closing of the vehicle door by a user and presence or absence of a state where a person exists in proximity of the vehicle door based on variation in an electrostatic capacity in the electrode.

According to this configuration, it is possible to detect an action of opening/closing the vehicle door and the person's proximity to the vehicle door using one electrostatic sensor. Thereby, a control device, which opens and closes the vehicle door via driving of an actuator, may open and close the vehicle door by driving the actuator according to the detection result of the electrostatic sensor without providing a new detection device in a vehicle. In addition, the control device may not drive the actuator and may not open and close the vehicle door when the opening/closing of the vehicle door is input in a state where the proximity to the vehicle door has been detected. Thereby, it is difficult to throw a person who is located near the vehicle door into confusion such as, for example, a delay in noticing the opening/closing operation of the vehicle door.

The vehicle door opening/closing apparatus and the electrostatic sensor according to the aspects of this disclosure have an effect of making it difficult to cause confusion due to an opening/closing operation of a vehicle door.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle door opening/closing apparatus comprising:
 a sensor including a plurality of electrodes provided near a vehicle door, which is opened and closed by driving of an actuator, the sensor configured to:
  detect, based upon a detection pattern of capacitance of the plurality of electrodes, whether an object is within a movement path of the vehicle door, the detection pattern including a capacitance peak having a predetermined maximum value and predetermined rates of increase and decrease to and from the peak,
  determine that opening/closing of the vehicle door is permitted in a case that the object is not detected within the movement path of the vehicle door,
  determine that opening/closing of the vehicle door is prohibited in a case that the object is detected within the movement path of the vehicle door, and
  detect, based upon the detection pattern of capacitance of the plurality of electrodes, an opening/closing operation of requesting opening/closing of the vehicle door by a user, the opening/closing operation being detected when a variation in electrostatic capacity of the plurality of electrodes reaches a peak match for all of the plurality of electrodes and a decrease rate of the variation in the electrostatic capacity of the plurality of electrodes matches for all of the plurality of electrodes; and
 a controller configured to:
  drive the actuator when the sensor determines that the opening/closing operation of requesting opening/closing of the vehicle door by the user has been detected,
  drive the actuator when a request for opening/closing of the vehicle door is received from a device other than the sensor and the sensor determines that opening/closing of the vehicle door is permitted, and
  not drive the actuator when the request for opening/closing of the vehicle door is received from the device other than the sensor and the sensor determines that opening/closing of the vehicle door is prohibited.

2. The apparatus according to claim 1, wherein, when the controller receives the request for opening/closing of the vehicle door from the device other than the sensor in a state where the sensor determines that that opening/closing of the vehicle door is prohibited, the controller is configured to drive the actuator in response to the request once the sensor determines that opening/closing of the vehicle door is permitted.

3. The apparatus according to claim 2, wherein
 the plurality of electrodes includes an upper electrode provided on a vehicle lower portion below the vehicle door and a lower electrode provided below the upper electrode in a gravitational direction, and
 the sensor is configured to:
  determine that opening/closing of the vehicle door is permitted based upon non-proximity detection of the upper electrode,
  determine that that the opening/closing operation of requesting opening/closing of the vehicle door by the user has been detected based upon proximity detection of both the upper electrode and the lower electrode, and
  determine that opening/closing of the vehicle door is prohibited based upon the proximity detection of the upper electrode and non-proximity detection of the lower electrode.

4. The apparatus according to claim 1, wherein
 the plurality of electrodes includes an upper electrode provided on a vehicle lower portion below the vehicle door and a lower electrode provided below the upper electrode in a gravitational direction, and
 the sensor is configured to:
  determine that opening/closing of the vehicle door is permitted based upon non-proximity detection of the upper electrode,
  determine that that the opening/closing operation of requesting opening/closing of the vehicle door by the user has been detected based upon proximity detection of both the upper electrode and the lower electrode, and
  determine that opening/closing of the vehicle door is prohibited based upon the proximity detection of the upper electrode and non-proximity detection of the lower electrode.

5. The apparatus according to claim 1, wherein the request for opening/closing of the vehicle door is received from a door opening/closing switch provided in a driver's seat.

6. The apparatus according to claim 1, wherein the request for opening/closing of the vehicle door is received from a door opening/closing switch provided on an electronic key.

7. The apparatus according to claim 1, wherein the sensor detects whether the object is within the movement path of the vehicle door by comparing capacitive variations in the plurality of electrodes to a plurality of thresholds.

8. A system comprising:
a sensor including a plurality of electrodes provided near a vehicle door, which is opened and closed by driving of an actuator, the sensor configured to:
    detect, based upon a detection pattern of capacitance of the plurality of electrodes, whether an object is within a movement path of the vehicle door, the detection pattern including a capacitance peak having a predetermined maximum value and predetermined rates of increase and decrease to and from the peak,
    determine that opening/closing of the vehicle door is permitted in a case that the object is not detected within the movement path of the vehicle door,
    determine that opening/closing of the vehicle door is prohibited in a cast that the object is detected within the movement path of the vehicle door, and
    detect, based upon the detection pattern of capacitance of the plurality of electrodes, an opening/closing operation of requesting opening/closing of the vehicle door by a user, the opening/closing operation being detected when a variation in electrostatic capacity of the plurality of electrodes reaches a peak match for all of the plurality of electrodes and a decrease rate of the variation in the electrostatic capacity of the plurality of electrodes matches for all of the plurality of electrodes;
a first door opening/closing switch provided in a driver's seat;
a second door opening/closing switch provided on an electronic key; and
a controller configured to:
    drive the actuator when the sensor determines that the opening/closing operation of requesting opening/closing of the vehicle door by the user has been detected,
    drive the actuator when a request for opening/closing of the vehicle door is received from one of the first and second door opening/closing switches and the sensor determines that opening/closing of the vehicle door is permitted, and
    not drive the actuator when the request for opening/closing of the vehicle door is received from one of the first and second door opening/closing switches and the sensor determines that opening/closing of the vehicle door is prohibited.

9. The system according to claim 8, wherein, when the controller receives the request for opening/closing of the vehicle door from the one of the first and second door opening/closing switches in a state where the sensor determines that that opening/closing of the vehicle door is prohibited, the controller is configured to drive the actuator in response to the request once the sensor determines that opening/closing of the vehicle door is permitted.

10. The system according to claim 9, wherein
the plurality of electrodes includes an upper electrode provided on a vehicle lower portion below the vehicle door and a lower electrode provided below the upper electrode in a gravitational direction, and
the sensor is configured to:
    determine that opening/closing of the vehicle door is permitted based upon non-proximity detection of the upper electrode,
    determine that that the opening/closing operation of requesting opening/closing of the vehicle door by the user has been detected based upon proximity detection of both the upper electrode and the lower electrode, and
    determine that opening/closing of the vehicle door is prohibited based upon the proximity detection of the upper electrode and non-proximity detection of the lower electrode.

11. The system according to claim 8, wherein
the plurality of electrodes includes an upper electrode provided on a vehicle lower portion below the vehicle door and a lower electrode provided below the upper electrode in a gravitational direction, and
the sensor is configured to:
    determine that opening/closing of the vehicle door is permitted based upon non-proximity detection of the upper electrode,
    determine that that the opening/closing operation of requesting opening/closing of the vehicle door by the user has been detected based upon proximity detection of both the upper electrode and the lower electrode, and
    determine that opening/closing of the vehicle door is prohibited based upon the proximity detection of the upper electrode and non-proximity detection of the lower electrode.

12. A door opening/closing apparatus comprising:
a sensor including a plurality of electrodes provided near a door, which is opened and closed by driving of an actuator, the sensor configured to:
    detect, based upon a detection pattern of capacitance of the plurality of electrodes, whether an object is within a movement path of the door, the detection pattern including a capacitance peak having a predetermined maximum value and predetermined rates of increase and decrease to and from the peak,
    determine that opening/closing of the door is permitted in a case that the object is not detected within the movement path of the door,
    determine that opening/closing of the door is prohibited in a case that the object is detected within the movement path of the door, and
    detect, based upon the detection pattern of capacitance of the plurality of electrodes, an opening/closing operation of requesting opening/closing of the door by a user, the opening/closing operation being detected when a variation in electrostatic capacity of the plurality of electrodes reaches a peak match for all of the plurality of electrodes and a decrease rate of the variation in the electrostatic capacity of the plurality of electrodes matches for all of the plurality of electrodes; and
a controller configured to:
    drive the actuator when the sensor determines that the opening/closing operation of requesting opening/closing of the door by the user has been detected,
    drive the actuator when a request for opening/closing of the door is received from a device other than the sensor and the sensor determines that opening/closing of the door is permitted, and not drive the actuator when the request for opening/closing of the door is received from the device other than the sensor and the sensor determines that opening/closing of the door is prohibited.

13. The apparatus according to claim 12, wherein, when the controller receives the request for opening/closing of the door from the device other than the sensor in a state where the sensor determines that that opening/closing of the door is prohibited, the controller is configured to drive the actuator in response to the request once the sensor determines that opening/closing of the door is permitted.

14. The apparatus according to claim 13, wherein
the plurality of electrodes includes an first electrode and a second electrode, and
the sensor is configured to:
   determine that opening/closing of the door is permitted based upon non-proximity detection of the first electrode,
   determine that that the opening/closing operation of requesting opening/closing of the door by the user has been detected based upon proximity detection of both the first electrode and the second electrode, and
   determine that opening/closing of the door is prohibited based upon the proximity detection of the first electrode and non-proximity detection of the second electrode.

15. The apparatus according to claim 12, wherein
the plurality of electrodes includes an first electrode and a second electrode, and
the sensor is configured to:
   determine that opening/closing of the door is permitted based upon non-proximity detection of the first electrode,
   determine that that the opening/closing operation of requesting opening/closing of the door by the user has been detected based upon proximity detection of both the first electrode and the second electrode, and
   determine that opening/closing of the door is prohibited based upon the proximity detection of the first electrode and non-proximity detection of the second electrode.

* * * * *